(12) United States Patent
Seegmiller et al.

(10) Patent No.: US 6,517,133 B2
(45) Date of Patent: Feb. 11, 2003

(54) SIGHTING MOUNT DEVICE (76) Inventors: Steve Seegmiller, 9832 N. Oquirrh View Dr., Eagle Mountain, UT (US) 84043; Scott Brockbank, 425 E. Paradise Dr., Orem, UT (US) 84097; Quint Schroeder, 1811 E. Sunset View La., Eagle Mountain, UT (US) 84043

( * ) Notice: Subject to any disclaimer, the term of this patent is extended or adjusted under 35 U.S.C. 154(b) by 0 days.

(21) Appl. No.: 09/758,965

(22) Filed: Jan. 10, 2001

(65) Prior Publication Data
US 2002/0089201 A1 Jul. 11, 2002

(51) Int. Cl.[7] .............................. G03B 17/56; F41G 1/16
(52) U.S. Cl. .......................... 294/139; 294/168; 42/72; 42/124; 248/177.1
(58) Field of Search ................................. 294/139, 168; 248/177.1, 187.1, 351; 42/72, 103, 124, 146

(56) References Cited

U.S. PATENT DOCUMENTS

| | | | | |
|---|---|---|---|---|
| 1,084,848 A | * | 1/1914 | Demele | 42/72 |
| 1,382,410 A | * | 6/1921 | Butler | 42/72 |
| 2,370,611 A | * | 2/1945 | Mais | 294/139 |
| 2,427,593 A | * | 9/1947 | Etzel, Jr. et al. | 294/139 |
| 2,806,416 A | * | 9/1957 | Jones, Jr. | 294/139 |
| 2,827,841 A | * | 5/1958 | Scarpelli | 294/139 |
| 3,488,488 A | * | 1/1970 | Crouch | 42/146 |
| 4,327,626 A | * | 5/1982 | McQueen | 42/72 |
| 4,615,134 A | * | 10/1986 | Beretta | 42/72 |
| 5,287,644 A | * | 2/1994 | Bolduc | 42/106 |
| 5,332,136 A | * | 7/1994 | Rudolph | 294/139 |
| 5,367,812 A | * | 11/1994 | Lautrec | 42/72 |
| 5,852,892 A | * | 12/1998 | Bilgeri et al. | 42/72 |
| 5,926,964 A | * | 7/1999 | Korapaty | 42/124 |
| 6,019,326 A | * | 2/2000 | Baerwolf et al. | 248/177.1 |
| 6,042,080 A | * | 3/2000 | Shepherd et al. | 248/683 |
| 6,276,085 B1 | * | 8/2001 | Wooten et al. | 42/72 |
| 6,336,285 B1 | * | 1/2002 | Baumer | 42/124 |

FOREIGN PATENT DOCUMENTS

CH  000332851  * 11/1958 .................. 42/103

* cited by examiner

Primary Examiner—Christopher P. Ellis
Assistant Examiner—Paul T. Chin
(74) Attorney, Agent, or Firm—Stoel Rives (57) ABSTRACT

Sight mounting devices may be utilized in combination with sighting devices such as sighting scopes, camcorders and camera. The sight mount device has an elastomeric mounting plate adapted to receive a variety of sighting devices. The sight mounting device is compact as it has a retractable shoulder stock extension that can be retracted and extended as needed. The sight mounting device is highly versatile in that it can be held like a rifle and can be mounted to a variety of devices such as a bipod, a tripod and a window mount.

20 Claims, 7 Drawing Sheets

SIGHTING MOUNT DEVICE

BACKGROUND OF THE INVENTION

1. The Field of the Invention

This invention relates to a sight mounting device that can be used to mount a variety of sighting devices such as a sighting scope, a camcorder or a camera. The device can be used with a bipod, a tripod and an automobile window mount.

2. Present State of the Art

When viewing objects such as wildlife through a sighting device such as a sighting scope, a camcorder, or a camera, one problem is movement of the sighting device. Since such sighting devices have such high magnification, movement of the sighting device easily and rapidly results in visual loss of the object being viewed. What is needed is a device that minimizes the likelihood of such movement.

In order for such a device to be ideally useful, it needs to have a universal mounting configuration that enables the sighting device to be used with a variety of sighting devices such as a sighting scope, a camcorder and a camera. Not only is a universal mounting configuration needed but a configuration is needed that is adapted to grip a variety of sighting devices in a manner such that the sighting device is securely held once mounted and is maintained in a set alignment.

When viewing objects such as wildlife, it is desirable to minimize the size and weight of equipment since it may be necessary to carry the device for some distance. Accordingly, a sight mounting device is needed that is compact and lightweight.

A versatile sight mounting device is also needed that can be used with a variety of structures such as conventional devices used to hold cameras and camcorders such as a tripod. A device is also needed that can be used with conventional devices used with rifles such as bipod or an automobile window mount.

SUMMARY AND OBJECTS OF THE INVENTION

It is an object of the present invention to provide a sight mounting device that is adapted to receive a variety of sighting devices such as a sighting scope, a camcorder and a camera.

It is also an object of the present invention to provide a sight mounting device that is adapted to grip a variety of sighting devices such as a sighting scope, a camcorder and a camera in a manner such that the sighting device is securely held once mounted and is maintained in a set alignment.

An additional object of the present invention is to provide a sight mounting device that is compact, and preferably light weight.

A further object of the present invention is to provide a sight mounting device that is versatile.

A feature of the present invention that enable these objects to be achieved is a support platform or mounting plate on a sight mounting device that provides for secure attachment with a variety of sighting devices such as a sighting scope, a camcorder or a camera. More particularly, the device has a stock body with a shallow recess on the top of the body that holds an elastomeric mounting plate of support platform adapted to receive a variety of sighting devices. The mounting plate and the recess are preferably sized such that the mounting plate extends slightly beyond the top of the stock body. Since the top of the stock body is flat, the mounting plate is the surface that is contacted by the sighting device as the sighting device is attached to the sight mounting device by a mount screw.

The sight mounting device is compact as it has a retractable shoulder stock extension that can be retracted and extended as needed. More particularly, the retractable shoulder stock extension has a slide rod that slides within a slide bore in the stock body. The slide rod has a slot extending along a portion of its length. The mount screw extends through the slot and the slide rod slides on the mount screw in and out of the slide bore in the stock body.

The sight mounting device is highly versatile in that it can be held like a rifle and can be mounted to a variety of devices. For example, it has a bipod mount aperture at its distal end so that a bipod can be attached to steady the sight mounting device on irregular terrain. It also has a tripod/window mount aperture so that either a window mount or a tripod can be attached.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
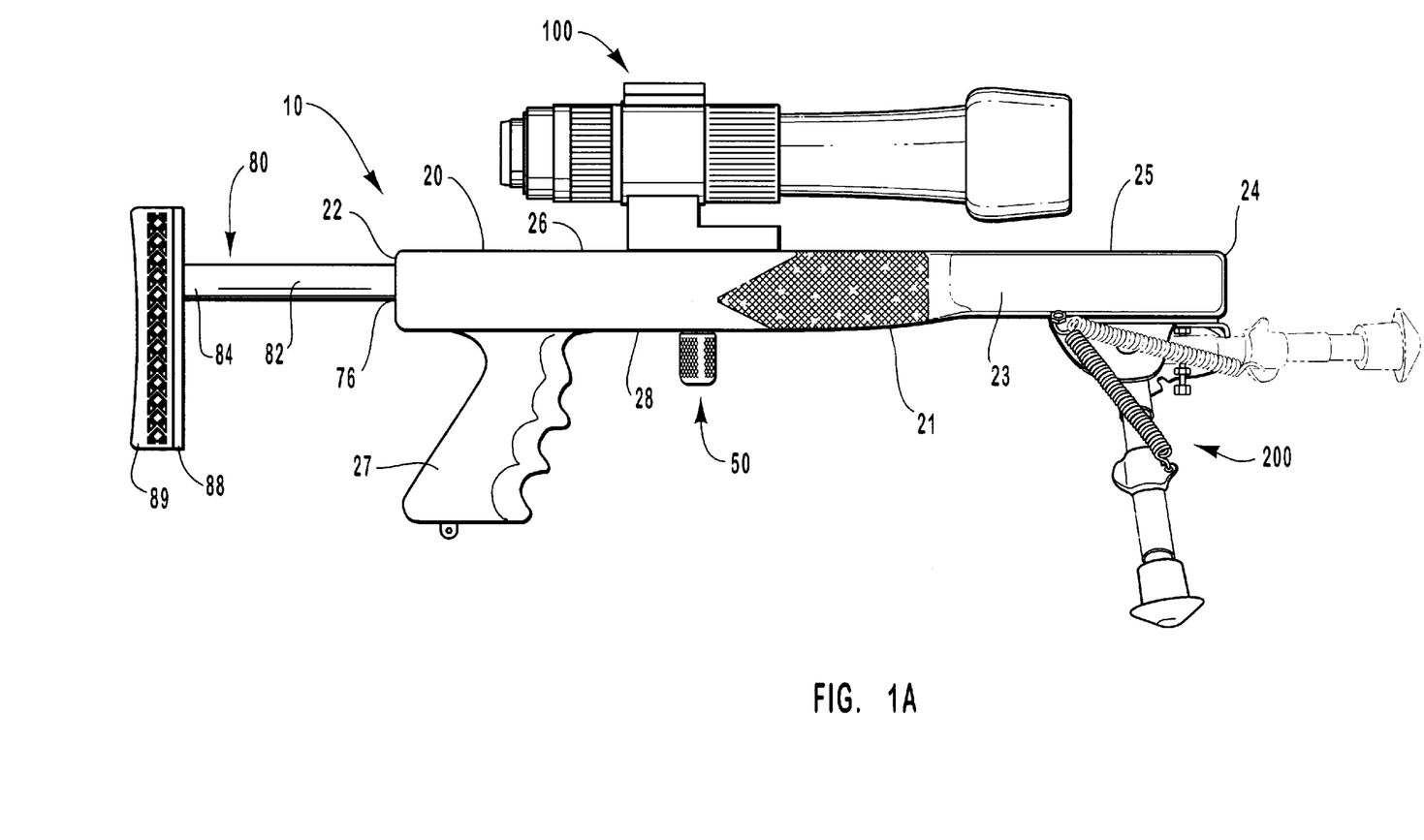
FIG. 1A is a perspective view of a sight mounting device having a sighting scope mounted on it. The sight mounting device also has a bipod attached to it.
Figure 1B:
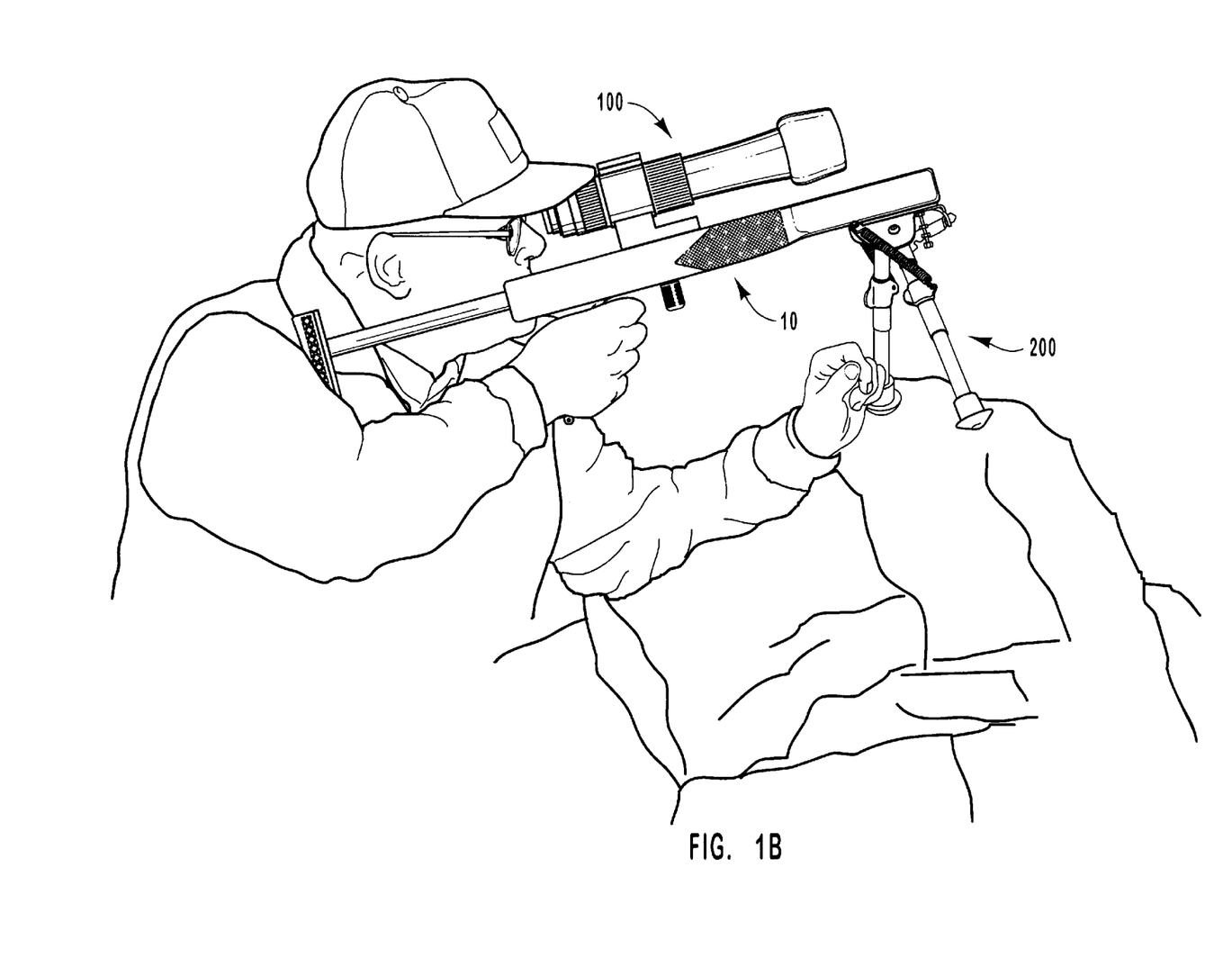
FIG. 1B is a perspective view of the sight mounting device shown in FIG. 1A being utilized with the bipod.
Figure 1C:
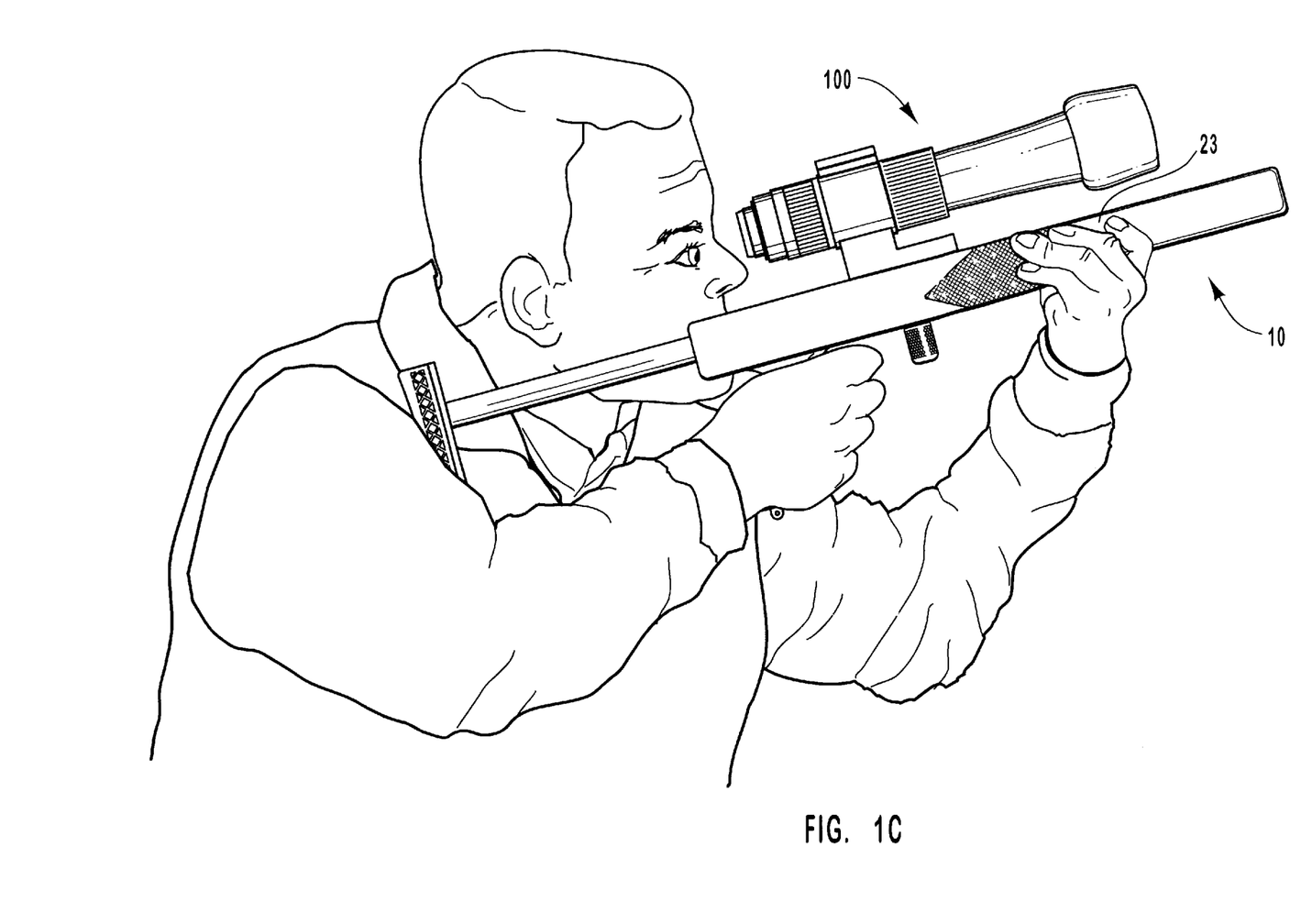
FIG. 1C is a perspective view of the sight mounting device shown in FIG. 1A being utilized like a rifle.
Figure 2:
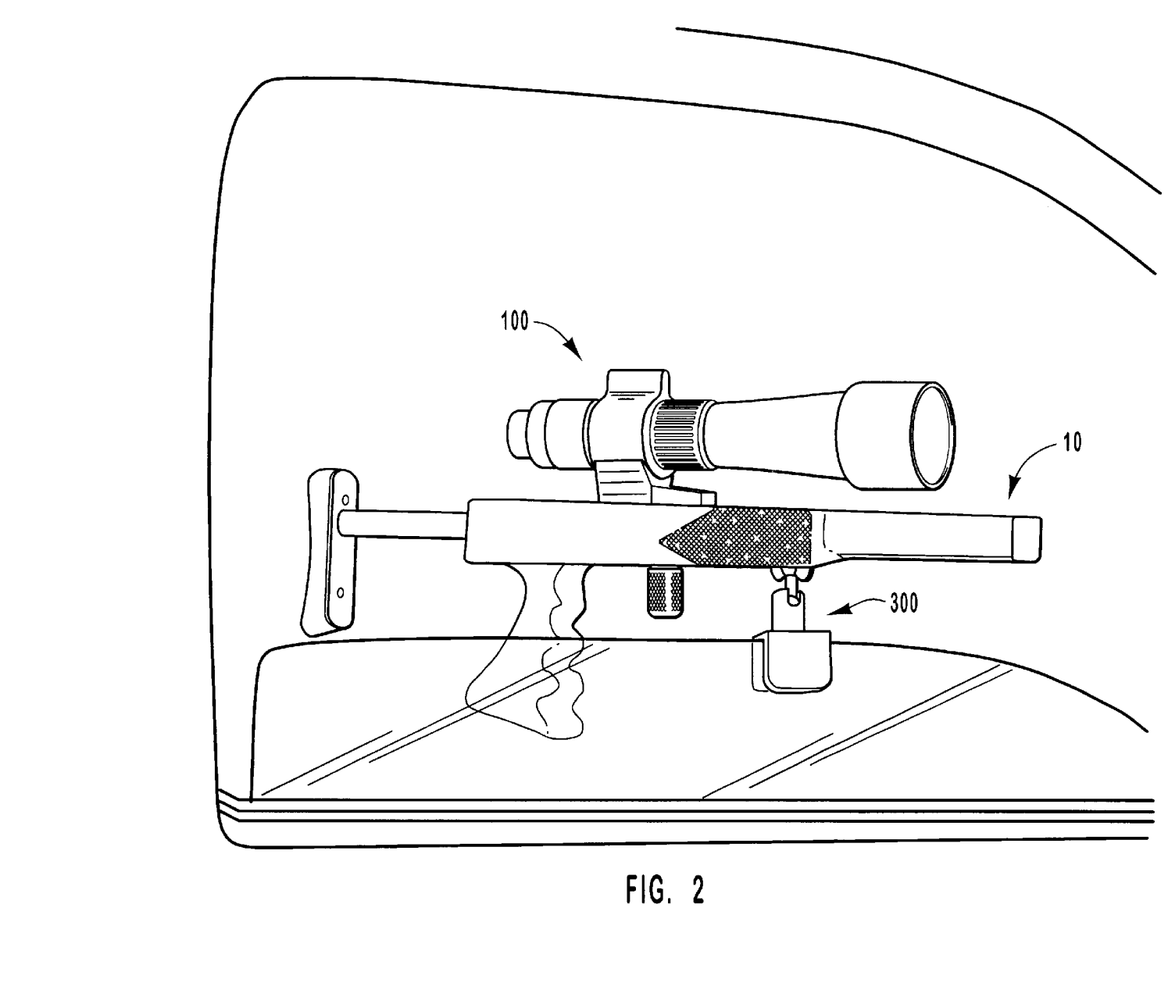
FIG. 2 is a perspective view of the sight mounting device shown in FIG. 1A with the bipod removed and with a window mount being utilized to hold the sight mounting device on an automobile window.
Figure 3:
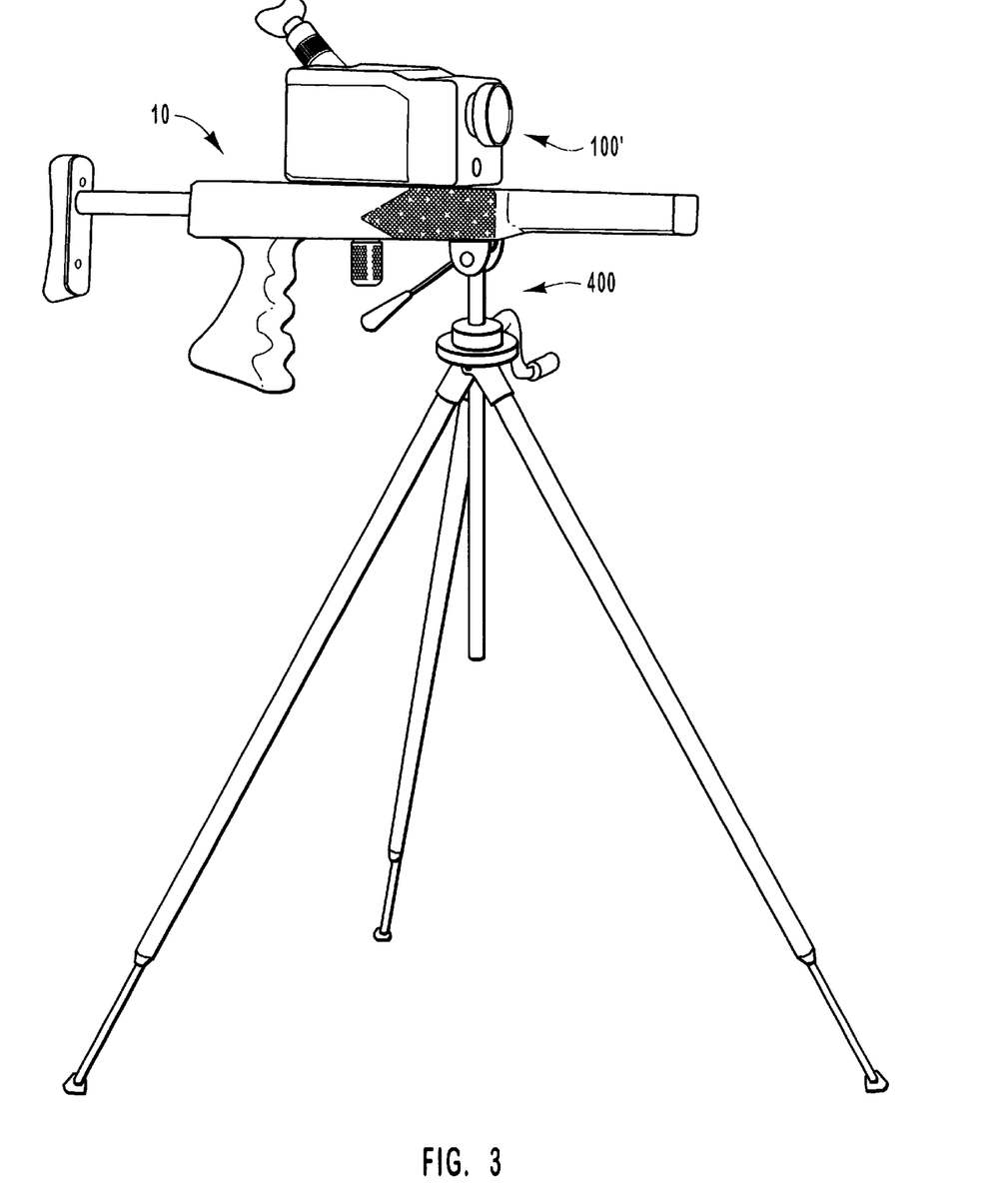
FIG. 3 is a perspective view of the sight mounting device shown in FIG. 1A with the bipod removed and with a tripod being utilized to hold the sight mounting device.

The sight mounting device 10 has several different uses as shown in FIGS. 1B–1C and FIGS. 2–3. Sight mounting device 10 provides a support platform for a variety of sighting devices such as sighting scope 100 shown in FIG. 1B, a camcorder 100' as shown in FIG. 3 or a camera. Additionally, sight mounting device 10 may be utilized in several different ways, all of which minimize movement of the sighting devices. For example, sight mounting device 10 may be used with a bipod as shown in FIG. 1B at 200. Sight mounting device 10 may also held like a rifle as shown in FIG. 1C. FIG. 2 shows sight mounting device 10 being utilized with a window mount 300 to attach sight mounting device 10 a window. FIG. 3 depicts a tripod 400 attached to sight mounting device 10 at the same position as an automobile window mount 300.

The versatility of sight mounting device 10 is achieved through a design that provides a support platform that can be universally used. Additionally, sight mounting device 10 is versatile as it has several attachment features that enable it to be held like a rifle and to be coupled with a bipod, and to be coupled with a window mount or a tripod. Another advantage of sight mounting device 10 is that it is relatively compact while providing these versatile features.

The features of sight mounting device 10 are best understood with reference to FIG. 1A, FIGS. 4A–4B and FIG. 5. Some of the main features include a stock 20 having a mount screw aperture 30, a mounting plate 42 and a mount screw 50. Other main features include a slide bore 70 and a retractable shoulder stock extension 80 having a slide rod 90.

Figure 4A:
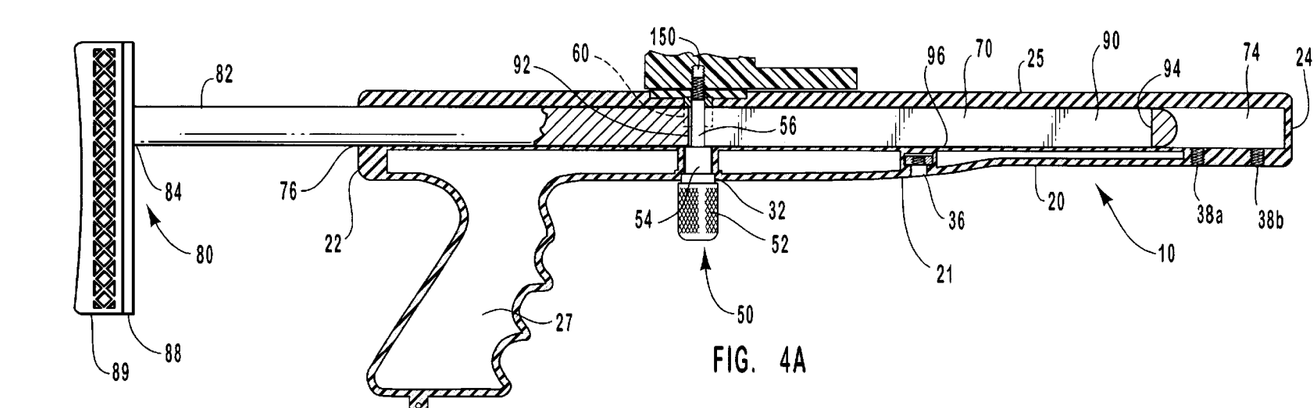
FIG. 4A is a cross-sectional view of the sight mounting device shown in FIG. 1A with a retractable shoulder stock extension in a retracted position.
Figure 4B:
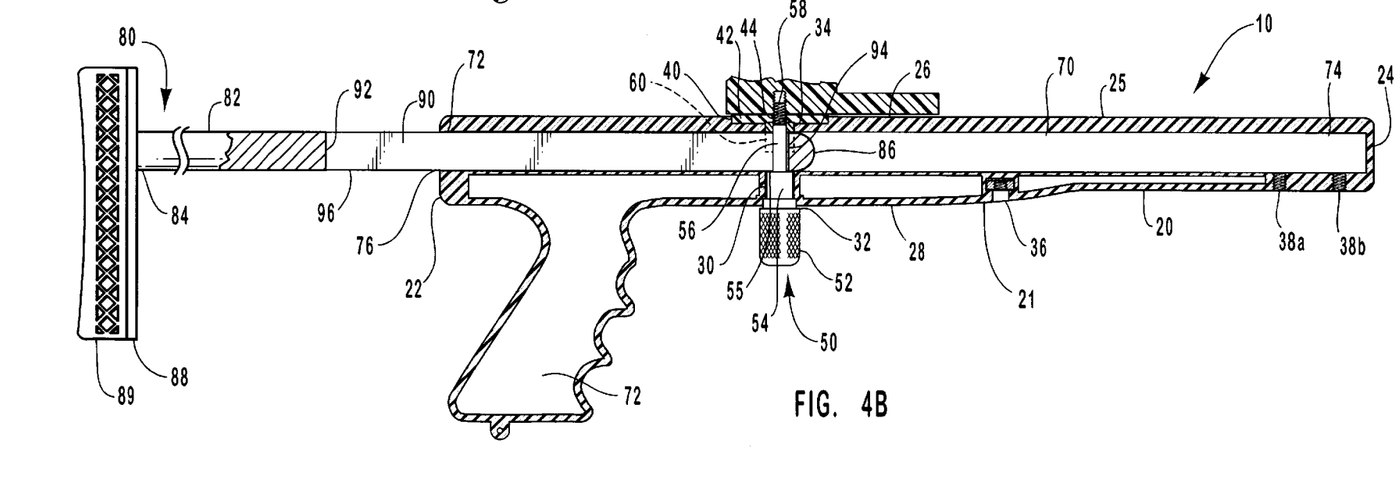
FIG. 4B is a cross-sectional view of the sight mounting device shown in FIG. 1A with a retractable shoulder stock extension in an extended position.

Stock 20 has an elongated stock body 21 with a proximal end 22 opposite from a distal end 24. Stock body 20 has a top 25 opposite from a bottom 28. Stock body 21 has sufficient length such that a user can grasp a grasping portion 23 of stock body 21 with one hand while grasping a hand grip 27 extending from the bottom of the stock body at its distal end 24 in a manner that is similar to that of a rifle as shown in FIG. 1C. Additionally, stock body 21 is configured such that it feels balanced to a user like a rifle as the user grasps grasping portion 23 and hand grip 27. Stock 20 may be formed by any method, however, it is preferably molded so that it is substantially hollow, as shown in FIGS. 4A–4B. Note that unlike a rifle, surface 26 of top 25 is generally solid or flat as stock 20 is not designed to house a firing mechanism.

As shown in FIGS. 4A–4B, stock body 21 has a mount screw aperture 30 extending through stock body 21 from the top 25 to the bottom 28 of stock body 21. Mount screw aperture 30 has a bottom opening 32 opposite from a top opening 34. Stock body 21 has a mounting plate recess 40 on the top 25 of stock body 21 in which a mounting plate 42 is positioned. Note that mount screw aperture 30 is positioned closer to the proximal end 22 than the distal end 24 of stock body 20.

Mounting plate 42 has an aperture 44 positioned in alignment with mount screw aperture 30 of stock body 21. Mounting plate 42 is preferably formed from an elastomeric material such as rubber to better frictionally engage the sighting device. More particularly, the frictional engagement of mounting plate 42 ensures that once the sighting device is set in alignment then it remains aligned. Note as shown in FIGS. 4A–4B, mounting plate 42 and mounting plate recess 40 are sized such that mounting plate 42 extends slightly beyond the top 25 of stock body 21 to enable mounting plate 42 to grip against the base of a sighting device and to prevent movement of the sighting device such as sighting scope 100. Note also that the top 25 of the stock body 21 has a surface 26 that is generally flat around mounting plate recess 40 and that is adapted for receiving a variety of sighting devices.

Mount screw 50 has a grasping portion 52 opposite from mounting threads 58. Mount screw 50 has sufficient length to extend from the bottom 28 of stock body 21 through mount screw aperture 30 and beyond the top 25 of stock body 21 to receive sighting devices in a threaded engagement on mounting threads 58. Mount screw 50 also has a slide rod engager 54 extending integrally from grasping portion 52 that is adapted to push against slide rod 82, as described below. More particularly, slide rod engager 54 extends from an optional stop 53. Mount screw 50 has a slot guide 56 that extends from slide rod engager 54. As shown best in FIG. 5, an optional locking nut 60 is positioned to be engaged by threads 58, as described below in greater detail.

Stock body 21 has a slide bore 70 extending longitudinally from a slide bore opening 76 at the proximal end 22 of stock body 21 toward the distal end 24 of stock body 21. Slide bore 70 also has a proximal end 72 and a distal end 74.

Retractable shoulder stock extension 80 has a slide rod 82 sized to extend within slide bore 70 of stock body 21. Slide rod 82 has an abutment end 84 opposite from a stop end 86. Abutment end 84 is outside of slide bore 70 and stop end 86 is positioned in slide bore 70. A butt plate 88 is attached to the slide rod at the abutment end 84 of slide rod 82. Butt pad 89 is attached to butt plate 88 to provide a cushion against a user's shoulder.

Slide rod 82 has a slot 90 extending along a portion of its length and having a proximal closed end 92 opposite from a distal closed end 94. Slot guide 56 is the portion of mount screw 50 adapted to extend through and engage slot 90 of slide rod 82. Once mount screw 50 is positioned in mount screw aperture 30, then slot guide 56 enables slide rod 82 to be retracted within slide bore 70 until the proximal closed end 92 of slot 90 abuts slot guide 56 and also enables slide rod 82 to be extended from slide bore 70 until the distal closed end 94 of slot 90 abuts slot guide 56. Note that slot 90 has a shape that corresponds with that of slot guide 56 so that substantial rotation of retractable shoulder stock extension 80 is prevented.

Slide rod 82 may have any suitable cross-sectional shape such a generally circular shape. However, the sides 96 around slot 90 of slide rod 82 are preferably flat. Such flat sides 96 are adapted to mate with the flat surfaces 55 of slide rod engager 54 of mount screw 50 to apply pressure against slide rod 82 so as to frictionally engage slide rod 82.

Figure 5:
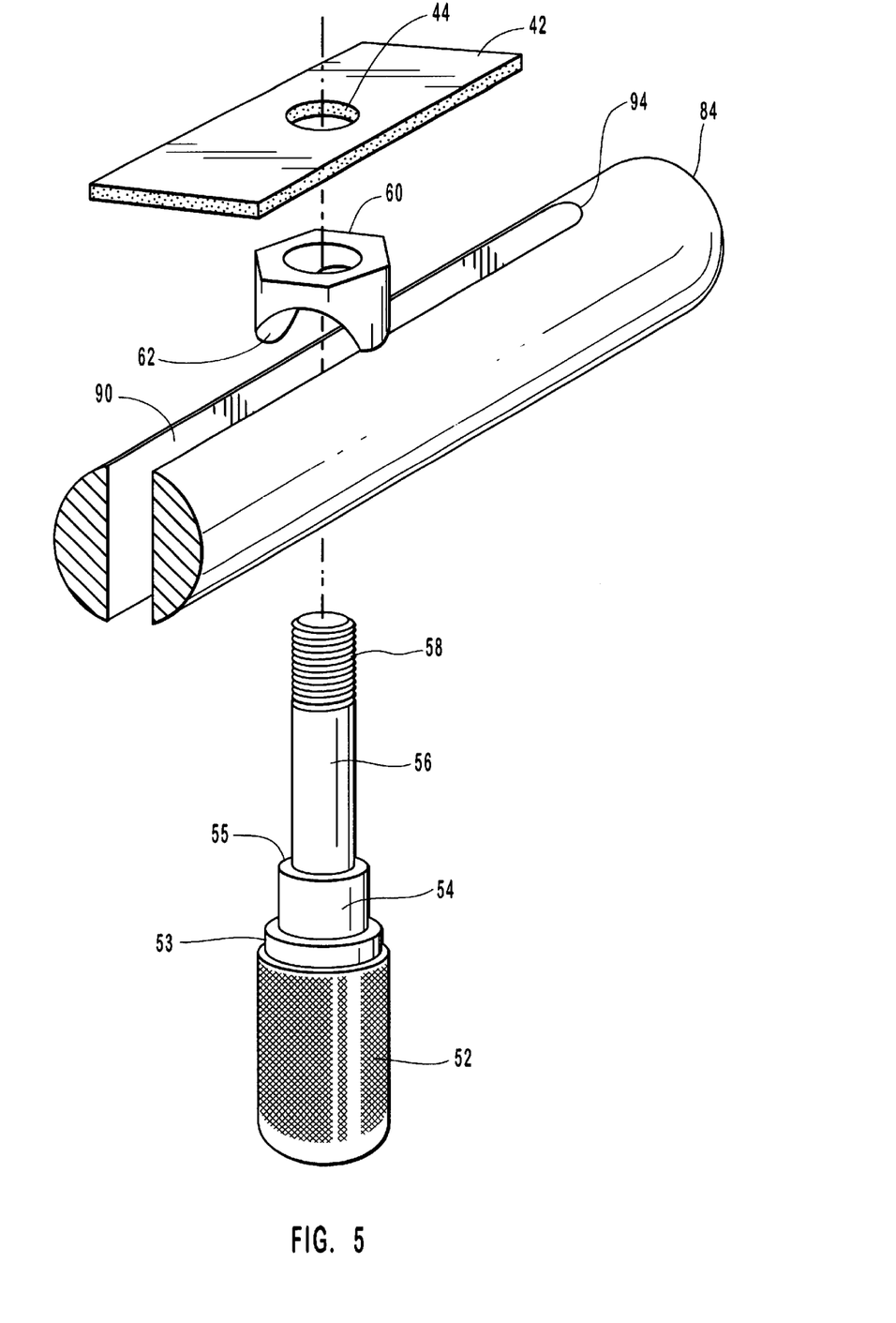
FIG. 5 is an exploded perspective view of a mounting plate, a locking nut, a slide rod and a mount screw.

Pressure can also be applied by optional locking nut 60 as locking nut 60 is engaged by threads 58 of mount screw 50. Locking nut 60 is shown in greater detail in FIG. 5. Locking nut 60 has a saddle-shaped surface 62 that is adapted to engage a slide rod with a circular cross-sectional shape such as slide rod 82. As shown in FIG. 5, locking nut 60 has a hexagonal shape which corresponds with a hexagonal shaped seat in stock body 21. Of course, locking nut 60 and it corresponding seat in stock body 21 may have any suitable shape that prevents locking nut 60 from rotating. As can be seen from the position of locking nut 60 in FIGS. 4A–4B, the threaded engagement of locking nut 60 with threads 58 of mount screw 50 pulls locking nut 60 against slide rod 82 as mount screw 50 is rotated. Bipod 200 may have any conventional configuration and may be attached by any conventional device such as a bipod mount screw or a plurality of bipod mount screws. Stock body 21 has bipod mount screw apertures 38a and 38b extending upward from the bottom 28 of stock body 21 and positioned at distal end 24 of stock body 21. Note that bipod mount screw can extend into slide bore 70 since apertures 38a and 38b open into slide bore 70. However, note that, as shown in FIG. 4A, the proximal closed end 92 of slot 90 prevents stop end 86 from extending in slide bore 70 towards the distal end 74 of slide bore in the region of bipod mount screw apertures 38a and 38b.

Window mount 300 and tripod 400 may also be attached to stock body 21 by any conventional device such as a screw. Note, however, as shown in FIGS. 4A–4B that tripod/window mount aperture 36 extends from the bottom of the stock body upward and is closed ended so that a screw used to mount the window mount or the tripod cannot extend into slide bore 70. Accordingly, stock body 21 has a thickness in the vicinity of aperture 36 so that aperture 36 has sufficient depth to receive such a screw in a manner that the window mount or tripod is securely attached to device 10. Tripod/window mount aperture 36 is positioned closer to distal end 24 of stock body 21 than is mount screw aperture 30.

The present invention may be embodied in other specific forms without departing from its spirit or essential characteristics. The described embodiments are to be considered in all respects only as illustrated and not restrictive. The scope of the invention is, therefore. indicated by the appended claims rather than by the foregoing description. All changes which come within the meaning and range of equivalency of the claims are to be embraced within their scope.

What is claimed and desired to be secured by United States Letters Patent is:

1. A sight mounting device comprising:
    a stock having an elongated stock body with a proximal end and a distal end, the stock body having a top opposite from a bottom, the stock having a hand grip extending from the bottom of the stock body at its distal end, the stock body having sufficient length such that a user can grasp the hand grip with one hand and grasp the stock body with the other hand in manner such that the stock is balanced, the stock body having a mount screw aperture extending through the stock body from the top to the bottom of the stock body, the body having a mounting plate recess on the top of the stock body, the top of the stock body having a surface that is generally flat around the mounting plate recess and that is adapted for receiving a variety of sighting devices,
    an elastomeric mounting plate positioned into the mounting plate recess on the top of the stock body in flush contact with the top of the stock body in the mounting plate recess, the mounting plate having an aperture positioned in alignment with the mount screw aperture of the stock body, and
    a mount screw having a grasping portion opposite from mounting threads, the mount screw having sufficient length to extend from the bottom of the stock body, through the mount screw aperture and beyond the top of the stock body to receive sighting devices in a threaded engagement.

2. A device as recited in claim 1, wherein the mount screw aperture is positioned closer to the proximal end than the distal end of the stock body.

3. A device as recited in claim 1, wherein the mounting plate and the mounting plate recess are sized such that the mounting plate extends slightly beyond the top of the stock body to enable the mounting plate to grip against a sighting device and prevent movement of the sighting device.

4. A device as recited in claim 3, wherein a locking nut is positioned to be engaged by the mounting threads of the mount screw in a manner such that the locking nut is pulled against the slide rod as the mount screw is rotated.

5. A device as recited in claim 1, wherein the stock body has a slide bore extending longitudinally from a slide bore opening at the proximal end toward the distal end, and wherein the apparatus further comprises a retractable shoulder stock extension having a slide rod sized to extend within the slide bore of the stock body, the slide rod having an abutment end opposite from a stop end, wherein the abutment end is outside of the slide bore and the stop end is positioned in the slide bore, the slide rod having a slot extending along a portion of its length and having a proximal closed end opposite from a distal closed end.

6. A device as recited in claim 5, wherein the mount screw has a slide rod engager extending integrally from the grasping portion that is adapted to push against the slide rod, wherein the mount screw has a slot guide adapted to extend through the slot of the slide rod to enable the slide rod to be retracted within the slide bore until the proximal closed end of the slot abuts the slot guide and to be extend from the slide bore until the distal closed end of the slot abuts the slot guide.

7. A device as recited in claim where 6, the slide rod has flat side around the slot of said slide rod, wherein the slide rod engager of the mounting screw has flat surfaces adapted to mate with the flat sides to apply pressure against the slide rod so as to frictionally engage the slide rod.

8. A device as recited in claim 1, further comprising a tripod/window mount aperture extending from the bottom of the stock body and positioned closer to the proximal end of the stock body than the mount screw aperture.

9. A device as recited in claim 1, further comprising at least one bipod mount aperture extending from the bottom of the stock body and positioned at the distal end of the stock body.

10. A sight mounting device comprising:
    a stock having an elongated stock body with a proximal end and a distal end, the stock body having a top opposite from a bottom, the stock having a hand grip extending from the bottom of the stock body at its distal end, the stock body having sufficient length such that a user can grasp the hand grip with one hand and grasp the stock body with the other hand in manner such that the stock is balanced, the stock body having a mount screw aperture extending through the stock body from the top to the bottom of the stock body, the body having mounting plate recess on the top of the stock body, the top of the stock body having a surface that is generally flat around the mounting plate recess and that is adapted for receiving a variety of sighting devices,
    a mounting plate positioned into the mounting plate recess on the top of the stock body in flush contact with the top of the stock body in the mounting plate recess, the mounting plate having an aperture positioned in alignment with the mount screw aperture of the stock body, the mounting plate and the mounting plate recess being sized such that the mounting plate extends slightly beyond the top of the stock body to enable the mounting plate to grip against a sighting device and prevent movement of the sighting device, and
    a mount screw having a grasping portion opposite from mounting threads, the mount screw having sufficient length to extend from the bottom of the stock body, through the mount screw aperture and beyond the top of the stock body to receive sighting devices in a threaded engagement.

11. A sight mounting device comprising:
    a stock having a stock body with a proximal end and a distal end, the stock body having a top opposite from a bottom, the stock body having a mount screw aperture extending through the stock body from the top to the bottom of the stock body, the stock body having a slide bore extending longitudinally from a slide bore opening at the proximal end toward the distal end, a retractable shoulder stock extension having a slide rod sized to extend within the slide bore of the stock body, the slide rod having an abutment end opposite from a stop end, wherein the abutment end is outside of the slide bore and the stop end is positioned in the slide bore, the slide rod having a slot extending along a portion of its length and having a proximal closed end opposite from a distal closed end, a mounting plate shaped to fit in a mounting plate recess on the top of the stock body, the mounting plate having an aperture positioned in alignment with the mount screw aperture of the stock body, and a mount screw having a grasping portion opposite from mounting threads, the mount screw having sufficient length to extend from the bottom of the stock body through the mount screw aperture and beyond the top of the stock body to receive sighting devices in a threaded engagement on the mounting threads, the mount screw having a slide rod engager extending integrally from the grasping portion that is adapted to push against the slide rod, the mount screw having a slot guide adapted to extend through the slot of the slide rod to enable the slide rod to be retracted within the slide bore until the proximal closed end of the slot abuts the slot guide and to be extend from the slide bore until the distal closed end of the slot abuts the slot guide.

12. A device as recited in claim 11, wherein the stock has a hand grip extending from the bottom of the stock body at its distal end, and wherein the stock body has sufficient length such that a user can grasp the hand grip with one hand and grasp the stock body with the other hand in manner such that the stock is balanced.

13. A device as recited in claim 11, wherein the mount screw aperture is positioned closer to the proximal end than the distal end of the stock body.

14. A device as recited in claim 11, wherein the top of the stock body has a surface that is generally flat around the mounting plate recess and that is adapted for receiving a variety of sighting devices.

15. A device as recited in claim 11, wherein the mounting plate and the mounting plate recess are sized such that the mounting plate extends slightly beyond the top of the stock body to enable the mounting plate to grip against a sighting device and prevent movement of the sighting device.

16. A device as recited in claim 11, wherein the mounting plate is elastomeric.

17. A device as recited in claim 11, wherein the slide rod has flat sides around the slot of the slide rod, wherein the slide rod engager of the mount screw has flat surfaces adapted to mate with the flat sides of the slide rod to apply pressure against the slide rod so as to frictionally engage the slide rod.

18. A device as recited in claim 11, wherein a locking nut is positioned to be engaged by the mounting threads of the mount screw in a manner such that the locking nut is pulled against the slide rod as the mount screw is rotated.

19. A device as recited in claim 11, further comprising a tripod/window mount aperture extending from the bottom of the stock body and positioned closer to the proximal end of the stock body than the mount screw aperture.

20. A device as recited in claim 11, further comprising at least one bipod mount aperture extending from the bottom of the stock body and positioned at the distal end of the stock body.

* * * * *